US010242440B2

(12) United States Patent
Vija et al.

(10) Patent No.: US 10,242,440 B2
(45) Date of Patent: Mar. 26, 2019

(54) DOSELESS EMISSION TOMOGRAPHY ATTENUATION CORRECTION

(71) Applicant: Siemens Medical Solutions USA, Inc., Malvern, PA (US)

(72) Inventors: Alexander Hans Vija, Evanston, IL (US); Xinhong Ding, Buffalo Grove, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1141 days.

(21) Appl. No.: 13/626,908

(22) Filed: Sep. 26, 2012

(65) Prior Publication Data

US 2013/0077844 A1 Mar. 28, 2013

Related U.S. Application Data

(60) Provisional application No. 61/539,004, filed on Sep. 26, 2011.

(51) Int. Cl.
*G06T 7/00* (2017.01)
*G06T 5/00* (2006.01)
*G06T 7/13* (2017.01)
*G06T 7/181* (2017.01)
*G06T 7/136* (2017.01)

(52) U.S. Cl.
CPC ............ *G06T 7/0012* (2013.01); *G06T 5/009* (2013.01); *G06T 7/13* (2017.01); *G06T 7/136* (2017.01); *G06T 7/181* (2017.01); *G06T 2207/10108* (2013.01); *G06T 2207/30016* (2013.01)

(58) Field of Classification Search
None
See application file for complete search history.

(56) References Cited

U.S. PATENT DOCUMENTS

2010/0156416 A1* 6/2010 Martinez-Moller et al. ................ 324/309
2012/0294503 A1* 11/2012 Fei et al. ...................... 382/131

OTHER PUBLICATIONS

A Boundary method for attenustion correction in positron computed tomography, by Huang et al., Basic Siences, vol. 22, No. 7. Mar. 13, 1981.*
Determination of the attenuation map in emmission tomography, by Zaidi et al., Aug. 21, 2002.*
A method for attenuation correction in radionuclide computed tomography, by Chang., Feb. 1978.*
Method to minimize dose for CT attenuation correction in SPECT, by Vija et al., Oct. 21, 2004.*

* cited by examiner

*Primary Examiner* — Vikkram Bali

(57) ABSTRACT

Systems and methods for generating corrected emission tomography images are provided. A method includes obtaining a reconstructed image based on emission tomography data of a head of a patient and defining a boundary region in the reconstructed image estimating a position of a skull of the patient in the reconstructed image. The method also includes generating a map of attenuation coefficient values for the reconstructed image based on the boundary region. The reconstructed image can then be adjusted based on the map. In the method, the attenuation coefficient values within the boundary region are selected to correspond to an attenuation coefficient value for bone and the attenuation coefficient values for the portion of the image surrounded by the boundary region are selected to correspond to an attenuation value for tissue.

20 Claims, 17 Drawing Sheets

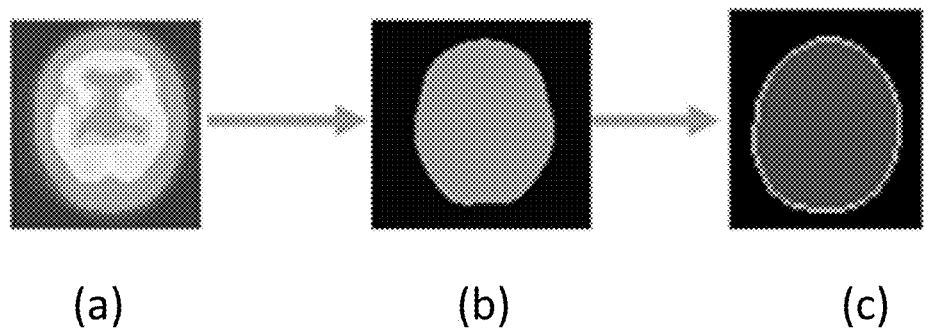
(a)          (b)          (c)
FIG. 3
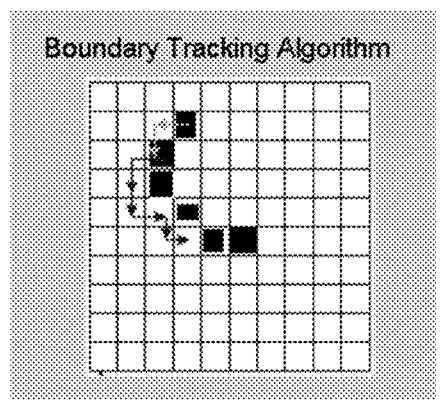 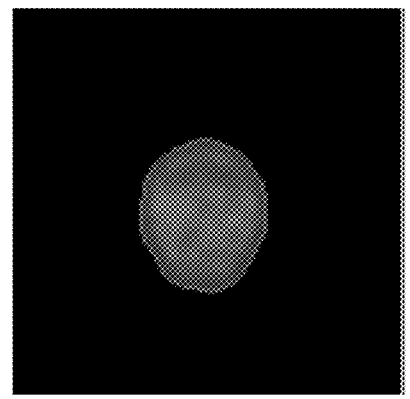
FIG. 4          FIG. 5

DOSELESS EMISSION TOMOGRAPHY ATTENUATION CORRECTION

CROSS-REFERENCE TO RELATED APPLICATION

This application claims benefit of U.S. Provisional Application No. 61/539,004, filed on Sep. 26, 2011, the entire disclosure of which is hereby incorporated by reference.

FIELD OF THE INVENTION

The present invention relates to attenuation correction for emission tomography, and more specifically to apparatus and methods for doseless emission tomography attenuation correction.

BACKGROUND

The attenuation correction is one of the most important steps in emission tomography imaging to assure a good image quality. In particular, attenuation correction is important for single-photon emission computed tomography (SPECT). Attenuation occurs when an emitted photon interacts with a material, such as patient tissues. In general, such attenuation due to several types of interactions with the patient tissues. For example, a photo-electric event can occur in which the photon is effectively stopped by the material. In another example, Compton scatter of the photon can occur, in which the photon is deflected from its original path, but with a loss of energy.

As a result of attenuation, a conventional SPECT system will generally detect less photons from deeper structures in the body than from tissues near the body surface. For example, in reconstruction of brain scans, there will generally be lower counts from the deeper structures in the brain (e.g., the basal ganglia).

One methodology for providing attenuation correction is to utilize a transmission-based imaging technique during SPECT imaging. For example, attenuation correction for SPECT is traditionally provided using data from an X-ray computed tomography (CT) scan concurrently obtained during SPECT imaging. However, such a methodology has several issues. First, many existing SPECT imaging systems do not include CT scan equipment and thus the necessary CT images cannot be obtained. Second, if attenuation needs to be performed on older image data, it is not possible to obtain the necessary CT scan data afterwards. Third, there may be concerns regarding dosing individuals with X-ray radiation. For example, in the case of pediatric patients, there is a general desire to limit exposure to X-ray radiation.

However, since the tissue structures of the brain can be considered to be generally uniform, the attenuation for the brain can also be generally considered to be constant. In the case of such uniform structures, the method described by Chang in "A method for attenuation correction in radionuclide computed tomography", *IEEE Trans Nucl Sci* 1978; 25:638-643, can then be applied without the need for a CT scan or other transmission-based imaging. Accordingly, many commercial SPECT systems are therefore configured to allow use of the filtered back projection (FBP) with the method of Chang to provide attenuation correction. The use of FPB with the method of Chang is an approximate method, which simply calculates the average attenuation for photons travelling from each point in the body at different angles. In general the method of Chang consists of performing a multiplication by a correction factor at each point, with typically slight over-correction, even when using an effective attenuation coefficient.

However, the method of Chang has several deficiencies. First, operators must ensure that the correct body boundary is selected for the part of the body being corrected, since the algorithm will assume a constant attenuation within that boundary. For example, the required boundary is the edge of the head, not the edge of the brain, and this boundary is different in each transverse slice through the head. Second, the FBP method of Chang requires a user to manually specify the mu-values for different materials. Third, FBP methods, such as those of Chang, are known to provide inferior image quality as compared to a 3D iterative reconstruction methods used in other modern molecular imaging.

SUMMARY

Embodiments of the invention concern methods for attenuation correction in emission tomography images and systems and computer readable mediums implementing such methods. A first embodiment of the invention is a method of generating corrected emission tomography images. The method includes obtaining a reconstructed image based on emission tomography data of a head of a patient and defining a boundary region in the reconstructed image estimating a position of a skull of the patient in the reconstructed image. The method also includes generating a map of attenuation coefficient values for the reconstructed image based on the boundary region, where the attenuation coefficient values within the boundary region are selected to correspond to an attenuation coefficient value for bone, and where the attenuation coefficient values for the portion of the image surrounded by the boundary region are selected to correspond to an attenuation value for tissue. The method can further include correcting the emission tomography data based at least on the map of attenuation coefficient values.

In the method, the defining of the boundary region can include searching for a natural boundary of the skull in the reconstructed image. The search can include selecting a threshold pixel value, generating a binary image from the reconstructed image based on the threshold pixel value, and selecting pixels in the reconstructed image to be associated with the natural boundary based on a boundary tracking algorithm. Alternatively, the method can include approximating a natural boundary of the skull using a model shape. In some embodiments, the model shape is a super ellipse.

In the method, the obtaining of the reconstructed image includes reconstructing the reconstructed image based on a portion of the emission tomography data associated with a scatter window. The emission tomography data comprises single photon emission tomography data, positron emission tomography data, or any other type of emission tomography data.

A second embodiment of the invention is a system for correcting emission tomography images. The system can include a processor and a computer readable medium storing instructions for controlling the processor to perform any of steps of a method for correcting emission tomography images, including the method of the first embodiment.

A third embodiment of the invention is a non-transitory computer readable medium having stored thereon a plurality of instructions for performing a method of generating corrected emission tomography images, including the method of the first embodiment.

BRIEF DESCRIPTION OF THE DRAWINGS

FIG. 3 illustrates an exemplary boundary segmentation process utilizing a boundary tracking algorithm;

FIG. 4 below illustrates the operation of a boundary tracking algorithm;

FIG. 5 shows an example of the results on a clinical brain image of a boundary segmentation process utilizing a boundary tracking algorithm;

DETAILED DESCRIPTION

Figure 1:
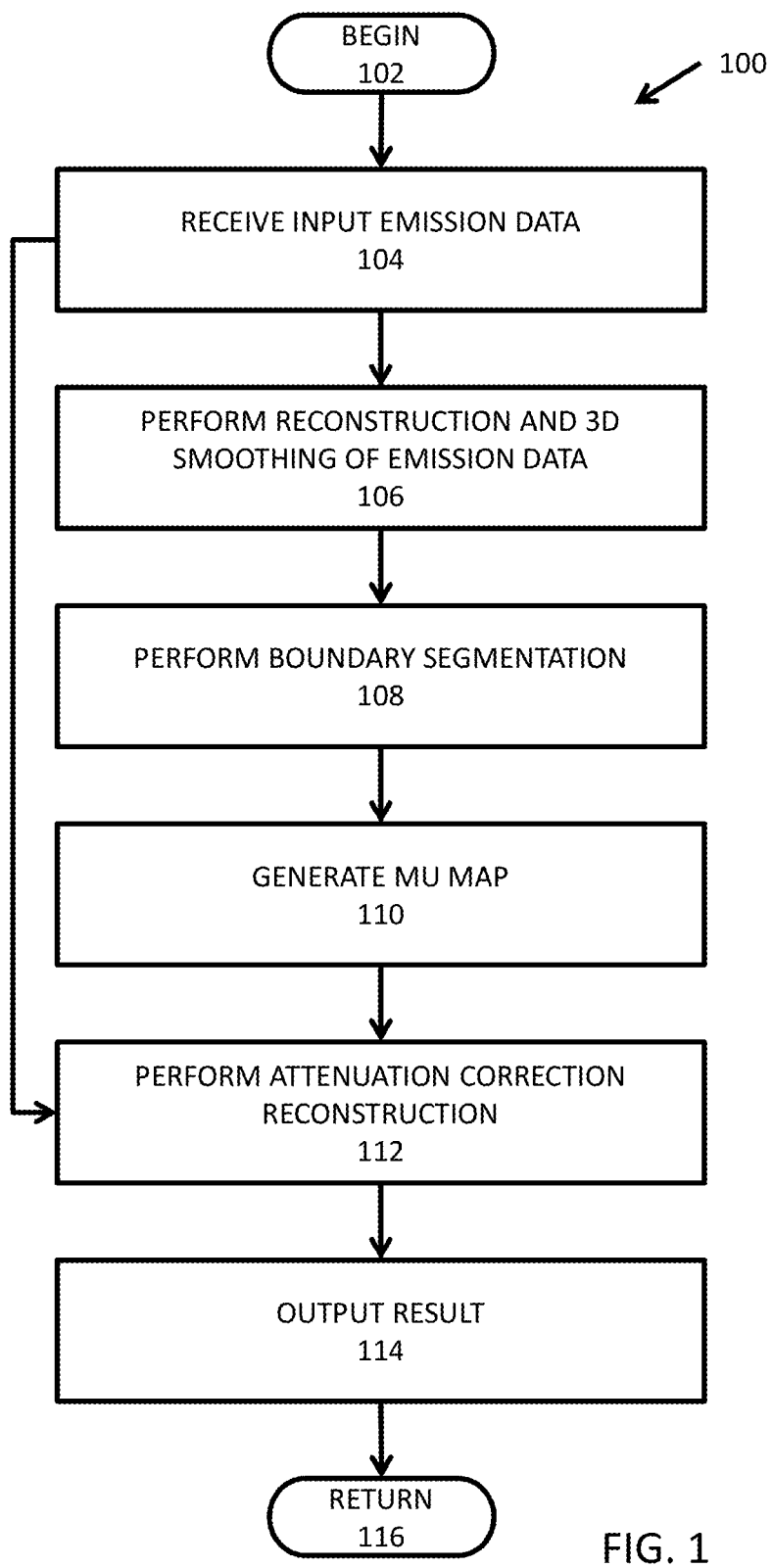
FIG. 1 is a flowchart of steps in an exemplary method for SPECT imaging, using the doseless attenuation correction methodology of the various embodiments.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

In view of the limitations of the various methods described above, the various embodiments are directed to a transmission-less or doseless methodology for providing attenuation correction for emission tomography during brain scans. Although the various embodiments will be described primarily with respect to SPECT imaging, such as the SPECT system described below with respect to FIG. 18, the various embodiments are not limited in this regard. Rather, the methodology described here is equally applicant to any other emission tomography imaging techniques, such as position emission tomography (PET) or other SPECT systems not described herein.

In the various embodiments, the doseless attenuation correction methodology for a brain scan includes creating a synthetic mu map volume based on the reconstruction of emission data, where the mu value for the skull is set to the attenuation coefficient corresponding to bone at the same emission energy level, and the mu map for the interior of the brain is set to the attenuation coefficient corresponding to soft tissue at the same emission energy level. To create the mu map for each transverse slice of the brain image, the skull of the brain is approximated in the various embodiments. In one particular embodiment, an ellipse can be used for the approximation. In another particular embodiment a tracking algorithm can be used to detect the natural boundary. Thereafter, a synthetic mu map is created based on the boundary and the resulting synthetic mu map can then be used to define separate DICOM series and can be saved to database if desired.

The doseless attenuation correction methodology of the various embodiments is described in greater detail with respect to FIG. 1. FIG. 1 is a flowchart of steps in an exemplary method 100 for SPECT imaging, using the doseless attenuation correction methodology of the various embodiments. Method 100 begins at step 102 and continues to step 104. At step 104, input emission SPECT data is received from a SPECT imaging process. As known to those of ordinary skill in the art, SPECT imaging involves the injection of a gamma-emitting radioisotope (called radionuclide) into the bloodstream of the patient. Thereafter, SPECT imaging is performed by using a gamma camera to acquire multiple 2-D images (also called projections), from multiple angles. A computer is then used to apply a tomographic reconstruction algorithm to the multiple projections, yielding a 3-D dataset. The specific steps for performing the SPECT imaging can be performed in accordance with the SPECT imaging system being used. For example, one such system is described below with respect to FIG. 18.

Once the input emission data is received at step 104, an initial reconstruction and 3D smoothing of the SPECT data is performed at step 106. This reconstruction and 3D smoothing can be performed in accordance with any available method. The reconstruction and smoothing can be performed either on the raw scatter data (if it is available) or on the raw tomographic data. The purpose is to create a smoothed volume to allow proper segmentation and generation of a synthetic mu map volume in subsequent steps. The amount of smoothing can be determined on an ad-hoc basis by the operator. Thus, if the operator qualitatively believes that sufficient smoothing has been performed, the smoothing can be discontinued. Alternatively, a smoothing process can be applied with a default set of parameters and the result used, regardless of their appearance. In still other embodiments, the smoothing can be performed iteratively. In such cases, the smoothing can be discontinued once a criteria is met, such as a signal-to-noise ratio or the error in the smoothed pixel value set relative to the original pixel value set meets an error criteria.

Figure 2:
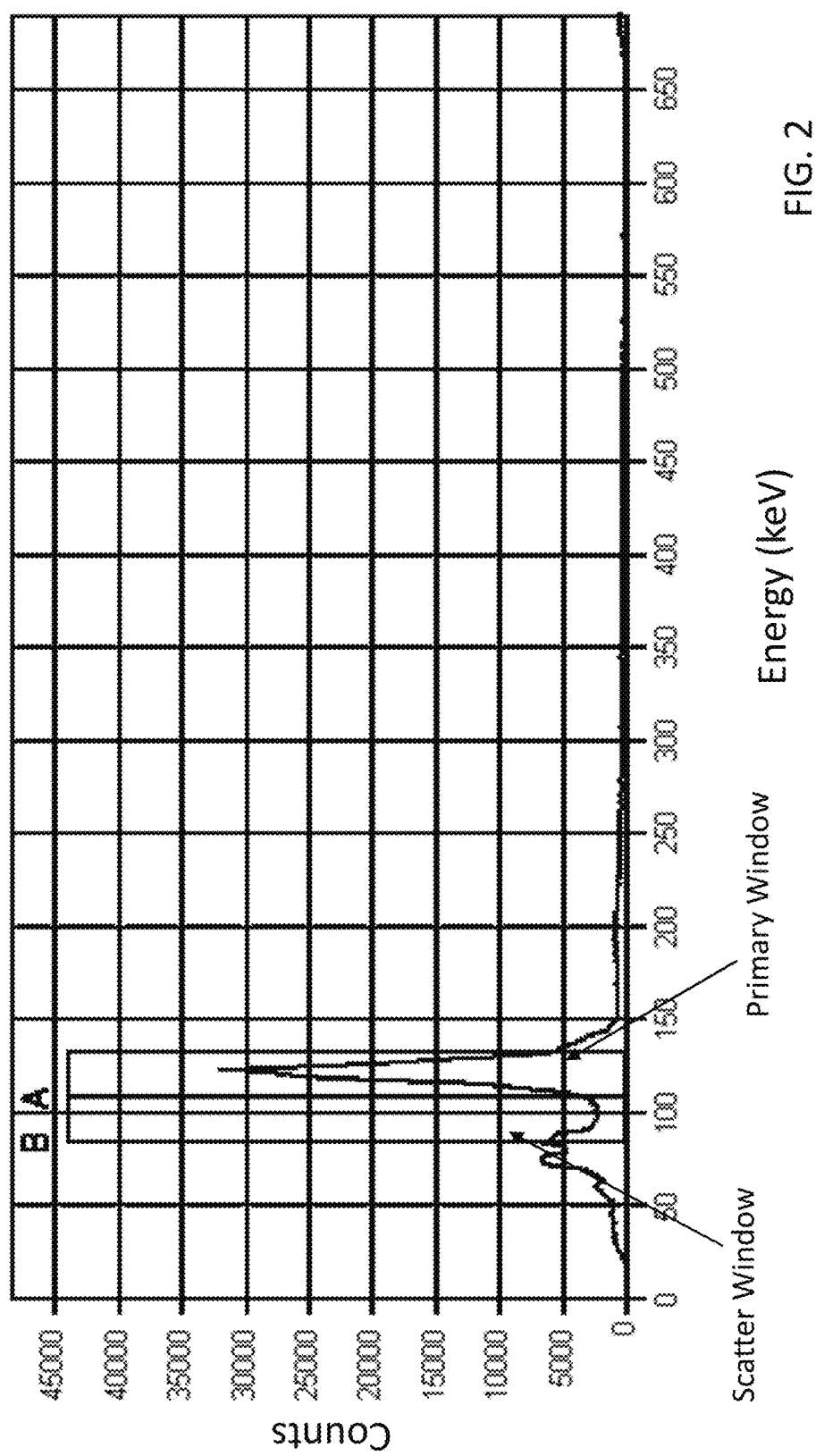
FIG. 2 is a plot of an exemplary emission spectrum illustrating primary and secondary emission windows.

In one particular embodiment, the brain image can be reconstructed using data from the scatter window, if it is available. In general, any emission spectrum will include counts in a primary window (photons emitted with little or no loss of energy) and a scatter window (photons emitted with energy loss due to scattering), as shown in FIG. 2 as windows A and B, respectively. The photons collected from the scatter window will typically include data with better boundary characteristics than the primary window data. This means that scatter window data would result in more realistic brain modeling. However, the various embodiments are not limited in this regard. Rather, in cases where the scatter window data is not available, the primary window data can be used instead.

Once the smoothed volume is created at step 106, the method 100 can proceed to step 108. At step 108, a boundary segmentation process is performed. This boundary segmentation can be performed in various ways.

In some embodiments, a boundary tracing system can be utilized to determine the natural boundary for the skull. That is, the boundary segmentation can begin with calculating a threshold for each slice of the smoothed volume. For example, the threshold can be 10% of the maximum pixel value of the image. However, the various embodiments are not limited in this regard and any other threshold values can be used. For example, the threshold can be any value in the range between 0% and 20% of the maximum pixel value of the image, such as 1%, 5%, 10%, 15%, or 20%. The threshold can then be applied to the smoothed image from step 106 to generate a binary image. A boundary tracking algorithm can thereafter be utilized to create or discern the boundary for each slice. These three basic operations are illustrated in FIG. 3. That is, (a) the raw, smooth image is received, (b) boundary segmentation is performed, and (3) the boundary is determined via the boundary tracking algorithm.

In one particular embodiment, the boundary tracking algorithm operates by first starting a search for the first edge pixel in image. The search order can be from top to bottom and left to right. Further, the search can then follow a set of rules. One exemplary set of rules to find the left boundary can include:

a. If the current pixel equals to 1, go to left;
b. If current pixel is 0, check the pixel value on the right.
c. If the right pixel is 1, mark that pixel as edge and go down;
d. If the right pixel is 0, go to right.

The right boundary can be found in a similar fashion, "go to left" is changed to "go to right" in rule (a) and "go the right" should be changed to "go to left" in rule (b). FIG. 4 below illustrates the operation of the boundary tracking algorithm. FIG. 5 shows an example of the actual tracking result on a clinical brain image.

Figure 6:
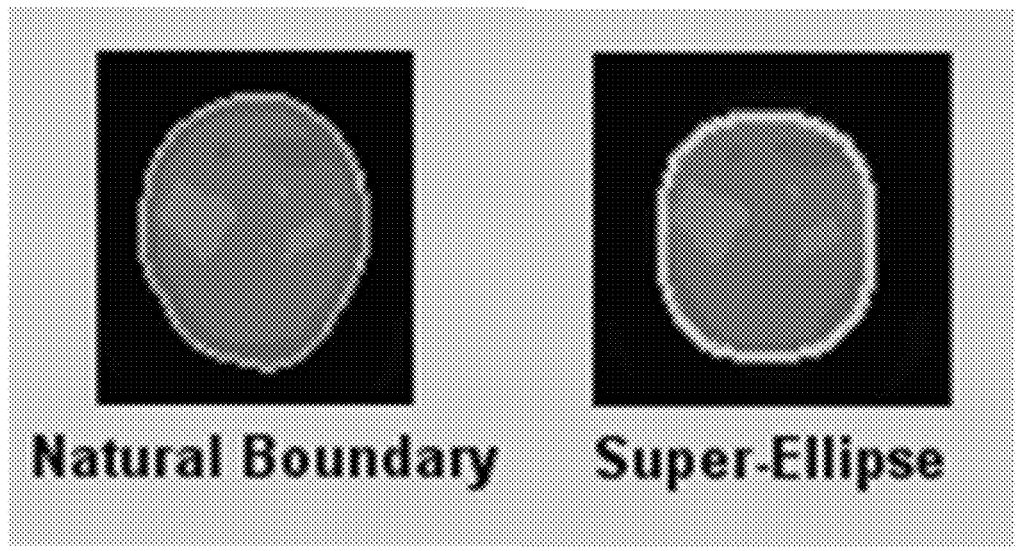
FIG. 6 shows the same SPECT scan with a natural boundary (derived via boundary tracking) and a super ellipse boundary.

In some embodiments, boundary tracing or tracking is not performed. Rather, a model is utilized to estimate the boundary. The use of such a model can be less computationally intensive than the boundary tracking process described above, as it only required selection of the center of the image. In one particular embodiment, a super ellipse is used. The super elliptic model guarantees the symmetry of left and right sides of the brain, and analysis thereof, which is important in many clinical cases. However, for certain pathologically distorted brains, skulls, or both, one may want to use the boundary tracking algorithm, as described above, to create more realistic boundary of the skull and brain. For example, FIG. 6 shows the same SPECT scan with a natural boundary (derived via boundary tracking) and a super ellipse boundary. Although the super ellipse generally approximates the natural boundary closely, it fails to track the asymmetric features observed in the natural boundary. Thus, as such asymmetric anatomical features become more pronounced in particular patients, the super ellipse model is less useful for approximating the boundary and the boundary tracking methodology should be considered instead.

As noted above, a super ellipse model can be used. In some cases, the generalized form for the super ellipse, rather than the standard form, can be used to model the boundary:

$$\left|\frac{x-x_o}{a}\right|^m + \left|\frac{y-y_o}{b}\right|^n \quad (1)$$

where $(x_o, y_o)$ is the center coordinates for the super ellipse, a is the scaling parameter in the x direction, b is the scaling parameter in the y direction, and m, n>0. In the standard super ellipse, m=n. However, since m and n need not be the same in these embodiments, this provides more flexibility in both the x and y directions for selecting the boundary.

Figure 7:
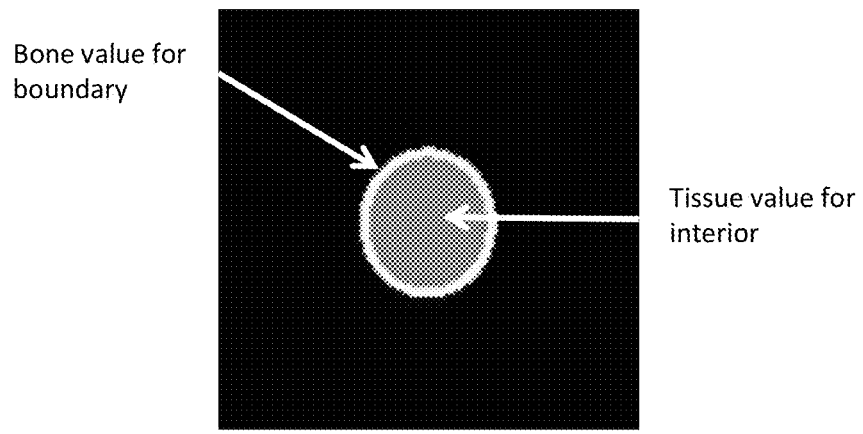
FIG. 7 shows an exemplary mu map resulting from a method in accordance with the various embodiments.

Once the boundary segmentation at step 108 is completed, an attenuation coefficient (mu) map can be generated at step 110. In the various embodiments, the mu map for each transverse slice consists of two regions: the boundary that approximates the brain skull, and the interior of the ellipse to represent rest of the brain. The attenuation coefficients on the boundary are set to the bone value at specific input emission energy, and the attenuation coefficients inside the boundary are set to the value corresponding to soft tissue. For the skull, the thickness of the boundary can be selected based on sex, age, other factors, or any combination of factors. An exemplary mu map resulting from this process is shown in FIG. 7. In the various embodiments, the attenuation coefficient values can be specified in various ways. In one particular embodiment, the attenuation coefficient values can be selected based on emission energy of photons (gamma photons) from the radioisotope, the energy window for the photons, and beam modeling.

Once the mu map is generated at step 110, attenuation correction can be applied at step 112 to the input emission data from step 104. Finally, the output SPECT image can be output at step 114. Thereafter, the method 100 can proceed to step 116 and continue previous processing, including repeating method 100.

Figure 8:
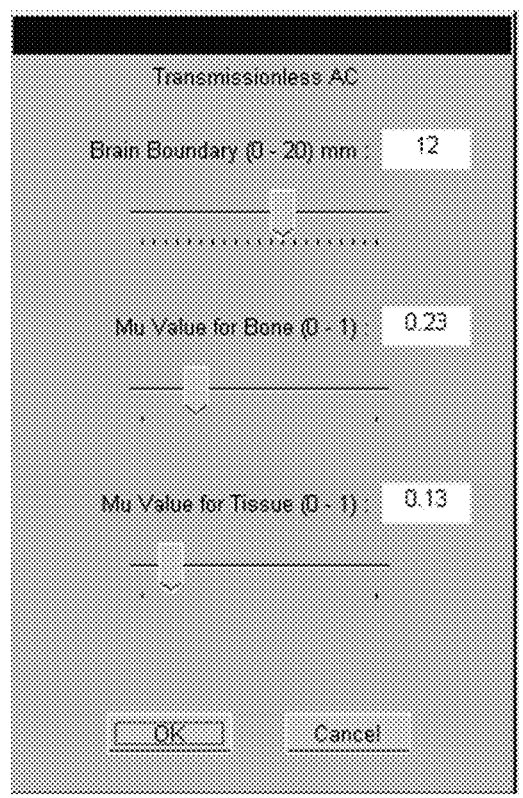
FIG. 8 shows a first exemplary configuration for a user interface element for selecting parameters for forming the mu map.
Figure 9:
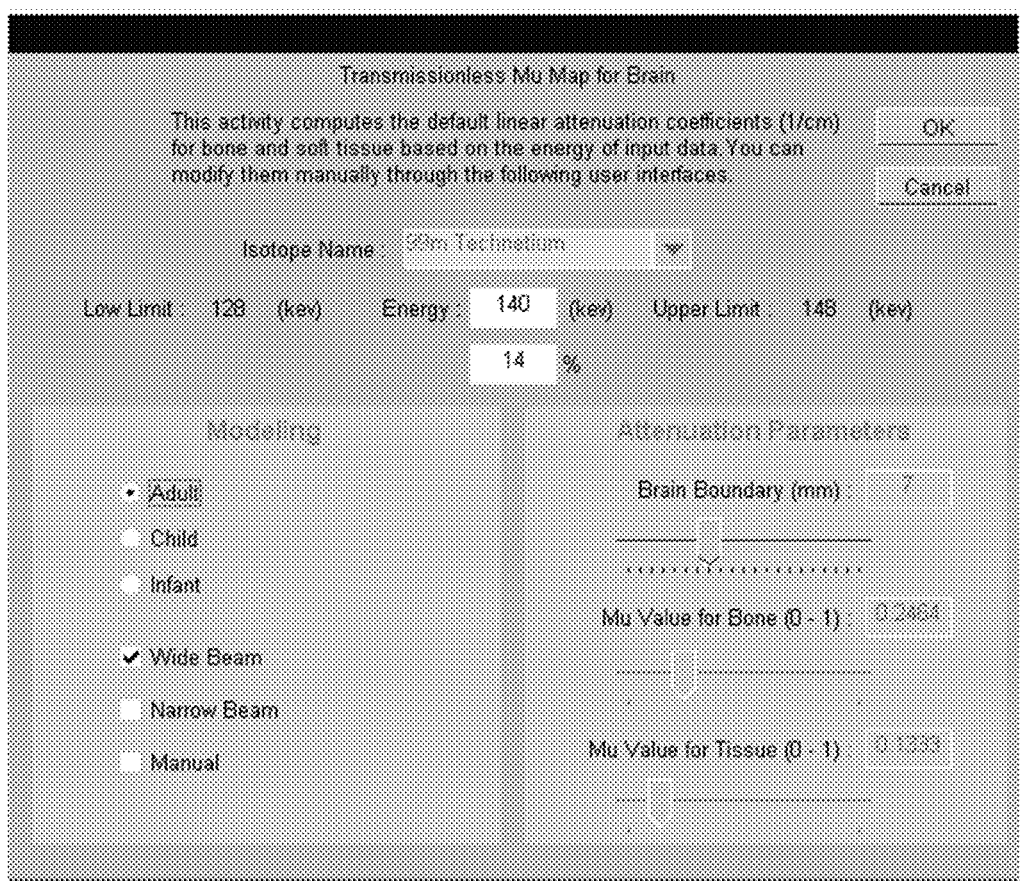
FIG. 9 shows a second exemplary configuration for a user interface element for selecting parameters for forming the mu map.

As noted above, several parameters can be selected for purposes of determining and applying attenuation correction. Thus, the user interface for the operator can be configured to allow the operator to select such parameters. For example, FIG. 8 shows one exemplary configuration for a user interface element for selecting parameters for forming the mu map. As shown therein, the user interface allows the operator to select a boundary width (i.e., a skull thickness) between 0 mm and 20 mm in 1 mm increments, a mu value for the bone (i.e., skull) between 0 and 1 in 0.01 increments, and a mu value for the tissue (i.e., brain) between 0 and 1 in 0.01 increments. However, in some embodiments, additional parameter selection can be provided. For example, FIG. 9 shows another exemplary configuration for a user interface element for forming the mu map. Similar to FIG. 8, the interface element in FIG. 9, also allows the operator to select a boundary width (i.e., a skull thickness) between 0 mm and 20 mm in 1 mm increments, a mu value for the bone (i.e., skull) between 0 and 1 in 0.0001 increments, and a mu value for the tissue (i.e., brain) between 0 and 1 in 0.0001 increments. However, the user interface element in FIG. 9 also allows the operator to specify the radioisotope, the energy of the photons from the radioisotopes, and the width of beam (e.g., wide, narrow, or manual). Further. The user interface element in FIG. 9 also allows the selection of the type of patient (e.g., adult, child, or infant).

Figure 10:
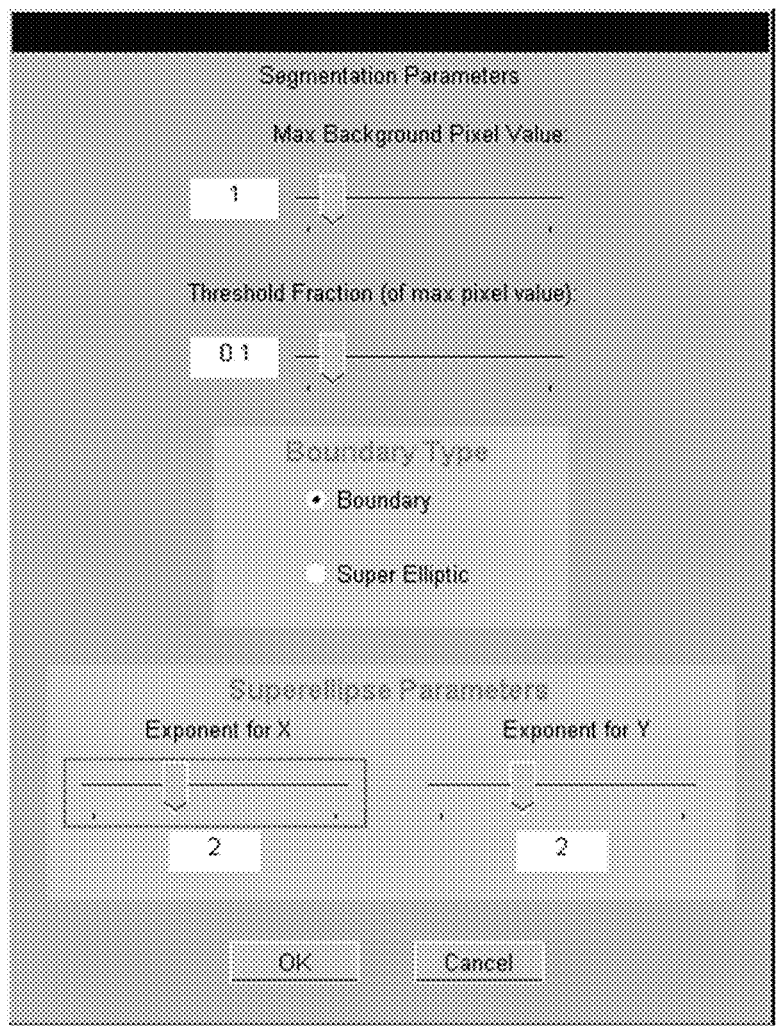
FIG. 10 shows an exemplary user interface element for specifying boundary segmentation parameters.

Similarly, a user interface element can be provided for controlling the boundary segmentation. Thus, the operator can customize, as needed, the boundary for a particular set f SPECT data. One such interface element is illustrated in FIG. 10. FIG. 10 shows an exemplary user interface element for specifying segmentation parameters. In particular, FIG. 10 shows that the user interface element allows the user to select a maximum value for background pixels, a threshold value for the segmenting in terms of the fraction of a maximum pixel value in a SPECT image, the boundary type (e.g., boundary tracking or super ellipse), and super ellipse parameters (e.g., m and n values for equation 1 above).

However, the various embodiments are not limited to these exemplary interface elements. Any other parameters of interest for generating the mu map and performing boundary segmentation not shown herein can also be specified in the interface element. Further, more or less controls than shown in the exemplary interface elements can be used in the various embodiments. Finally, although FIGS. 8-10 illustrate a specific arrangement of items in these interface elements, the various embodiments are not limited in this regard. Rather different arrangements of these items in the interface elements can be provided.

EXAMPLES

The following non-limiting Examples serve to illustrate selected embodiments of the invention. It will be appreciated that variations in proportions and alternatives in elements of the components shown will be apparent to those skilled in the art and are within the scope of embodiments of the present invention.

Phantom

Figure 11A:
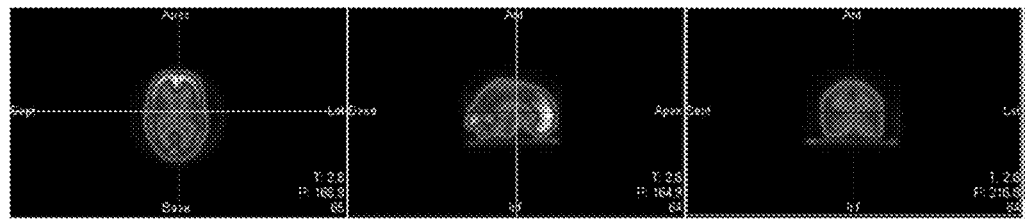
FIGS. 11A, 11B, and 11C show reconstruction results for a phantom without attenuation correction, with a CT-based attenuation correction, and with a doseless attenuation correction in accordance with the various embodiments, respectively.
Figure 11B:
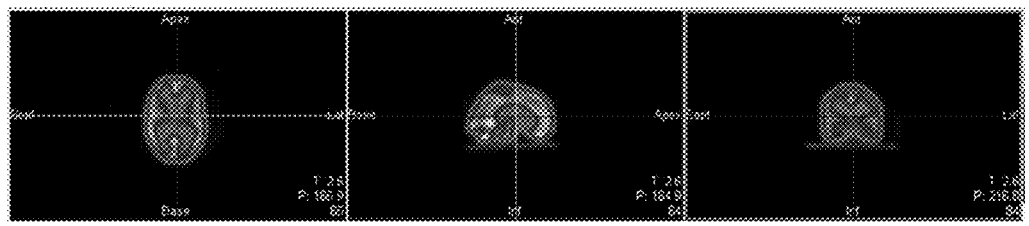
Figure 11C:
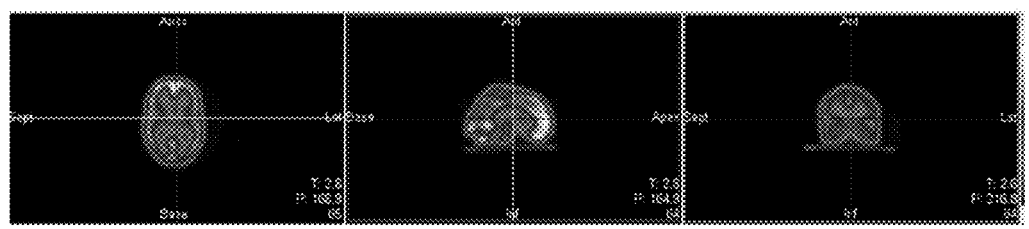

FIGS. 11A-11C shows the reconstruction results of the HOFFMAN 3-D BRAIN PHANTOM manufactured by BiODEX of Shirley, N.Y. for top, side, and front cross-section images. FIG. 11A shows the reconstructed images with no attenuation correction. FIG. 11B shows the reconstructed images with conventional CT attenuation correction. FIG. 11C shows the reconstructed images using a synthetic mu map in accordance with the various embodiments.

As can be seen from the images, at least qualitatively, the amount of detail visible in the images in FIG. 11C exceeds that observed in the images of FIG. 11A. Moreover, the amount of detail visible in the images in FIG. 11C appears to be comparable to that observed in the images of FIG. 11B. Thus, FIGS. 11A-11C show that the attenuation correction of the various embodiments provides at least an improvement in performance over no attenuation correction and can approximate the performance observed using CT attenuation correction.

Clinical Brain Images

Figure 12A:
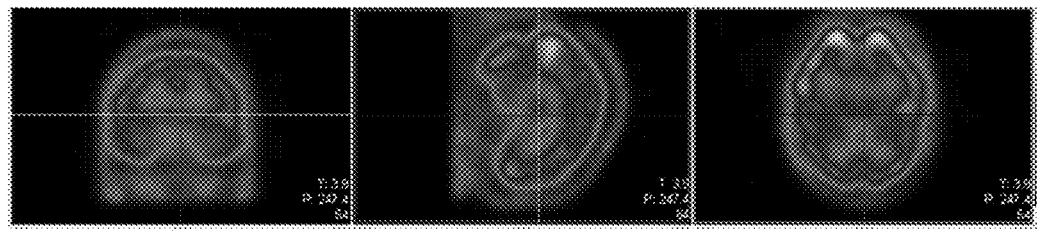
FIGS. 12A, 12B, and 12C show reconstruction results for a clinical brain without attenuation correction, with a CT-based attenuation correction, and with a doseless attenuation correction in accordance with the various embodiments, respectively.
Figure 12B:
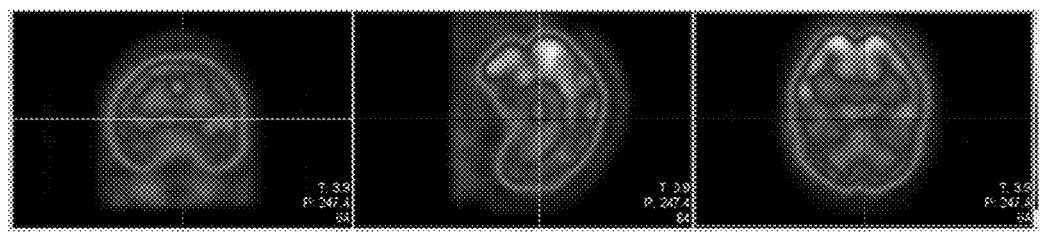
Figure 12C:
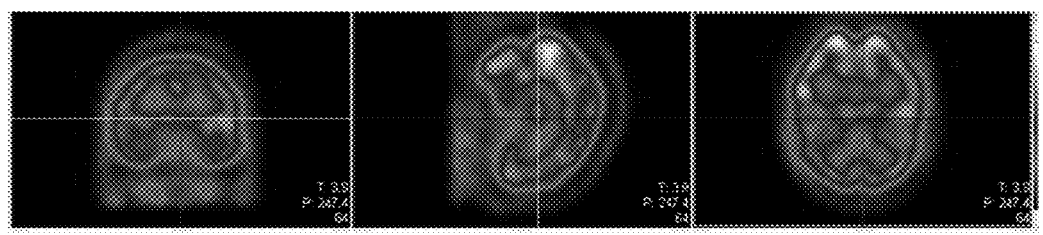

FIGS. 12A-12C shows the reconstruction results for a clinical patient. FIG. 12A shows the reconstructed images with no attenuation correction. FIG. 12B shows the reconstructed images with conventional CT attenuation correction. FIG. 12C shows the reconstructed images using a synthetic mu map in accordance with the various embodiments, where the mu map parameters were selected as follows: Skull thickness 10 mm, bone mu=0.23, tissue mu=0.13.

As can be seen from the images, at least qualitatively, the results are substantially similar to those of the HOFFMAN 3-D BRAIN PHANTOM shown in FIGS. 11A-11C. That is, the amount of detail visible in the images in FIG. 12C exceeds that observed in the images of FIG. 12A and the amount of detail visible in the images in FIG. 12C appears to be comparable to that observed in the images of FIG. 12B. Thus, FIGS. 12A-12C also show that the attenuation correction of the various embodiments provides at least an improvement in performance over no attenuation correction and can approximate the performance observed using CT attenuation correction.

Figure 13:
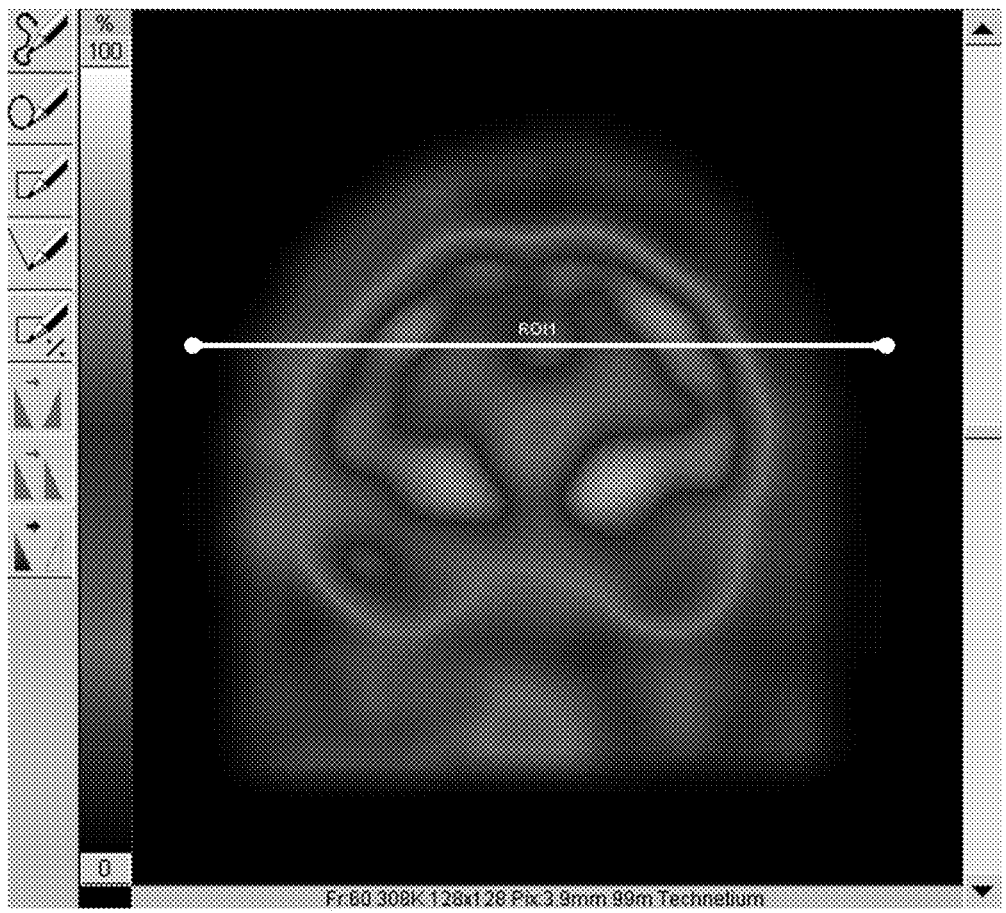
FIG. 13 illustrates a portion of the image being selected for the line profiles in FIGS. 14 and 15.

To gain a more quantitative understanding of the transmission less attenuation correction scheme, one pick the same image from the reconstructed volume with CT attenuation correction and from the doseless attenuation correction, and create two line profiles. A line profile can be created by profiling a cut through an image, as shown in FIG. 13, to compare the CT attenuation correction and the doseless attenuation correction of the various embodiments. This is illustrated in FIG. 14.

Figure 14:
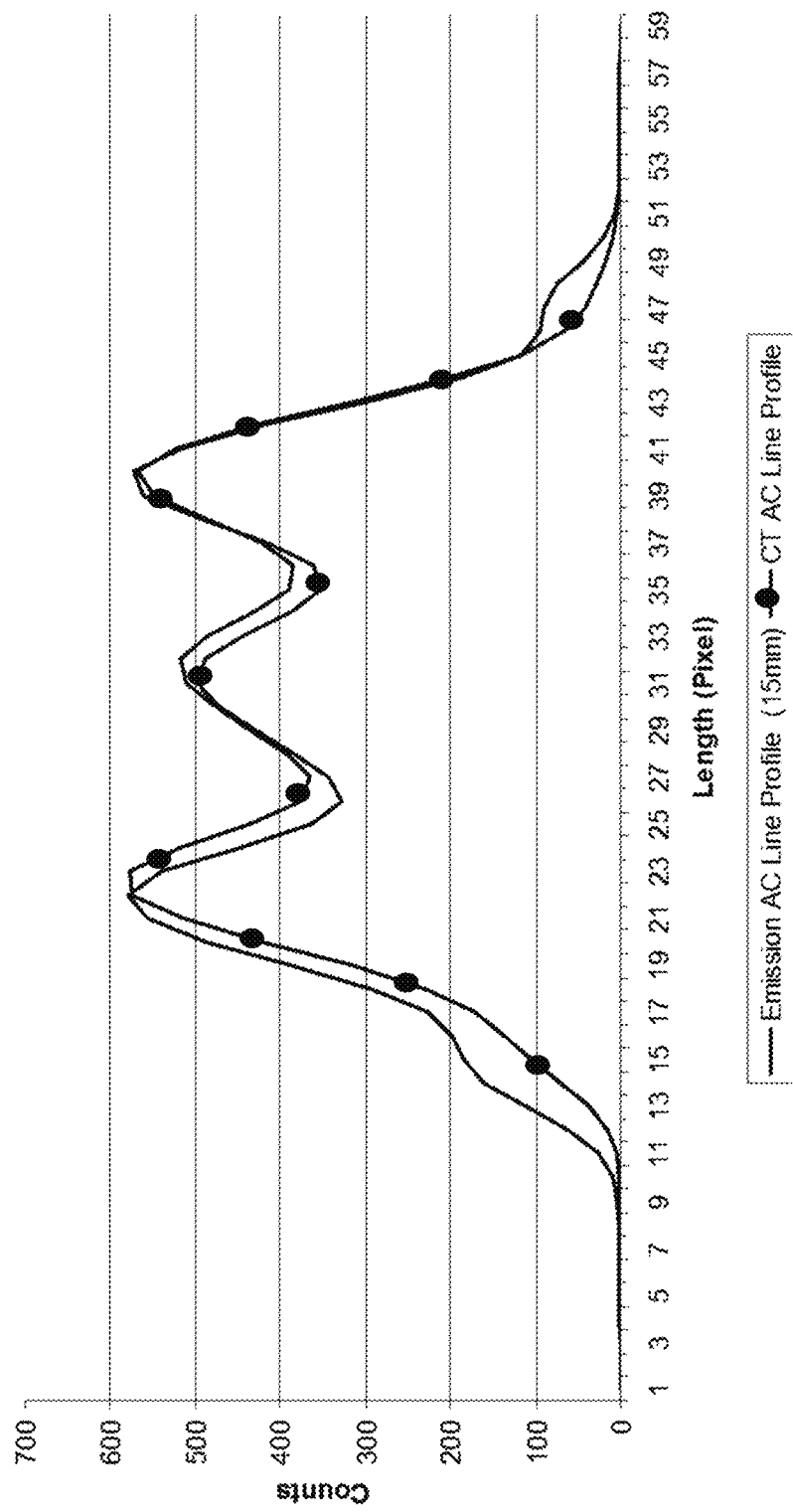
FIG. 14 is a plot of counts as a function of length for a line profile for an image using CT attenuation correction and the same image using doseless attenuation correction of the various embodiments.

FIG. 14 is a plot of counts as a function of length for a line profile for an image using CT attenuation correction and the same image using doseless attenuation correction of the various embodiments. As shown in FIG. 14, the shapes and the counts of the three peaks seem to match well in these two profiles. The only significant difference is that the tails of the doseless attenuation correction lacks of the smoothness as in the CT attenuation correction case. The difference in the tails can be the result of several factors such as, for example, the abrupt transition between attenuation coefficients for bone and tissue or any non-tissue space between the skull and the brain.

Figure 15:
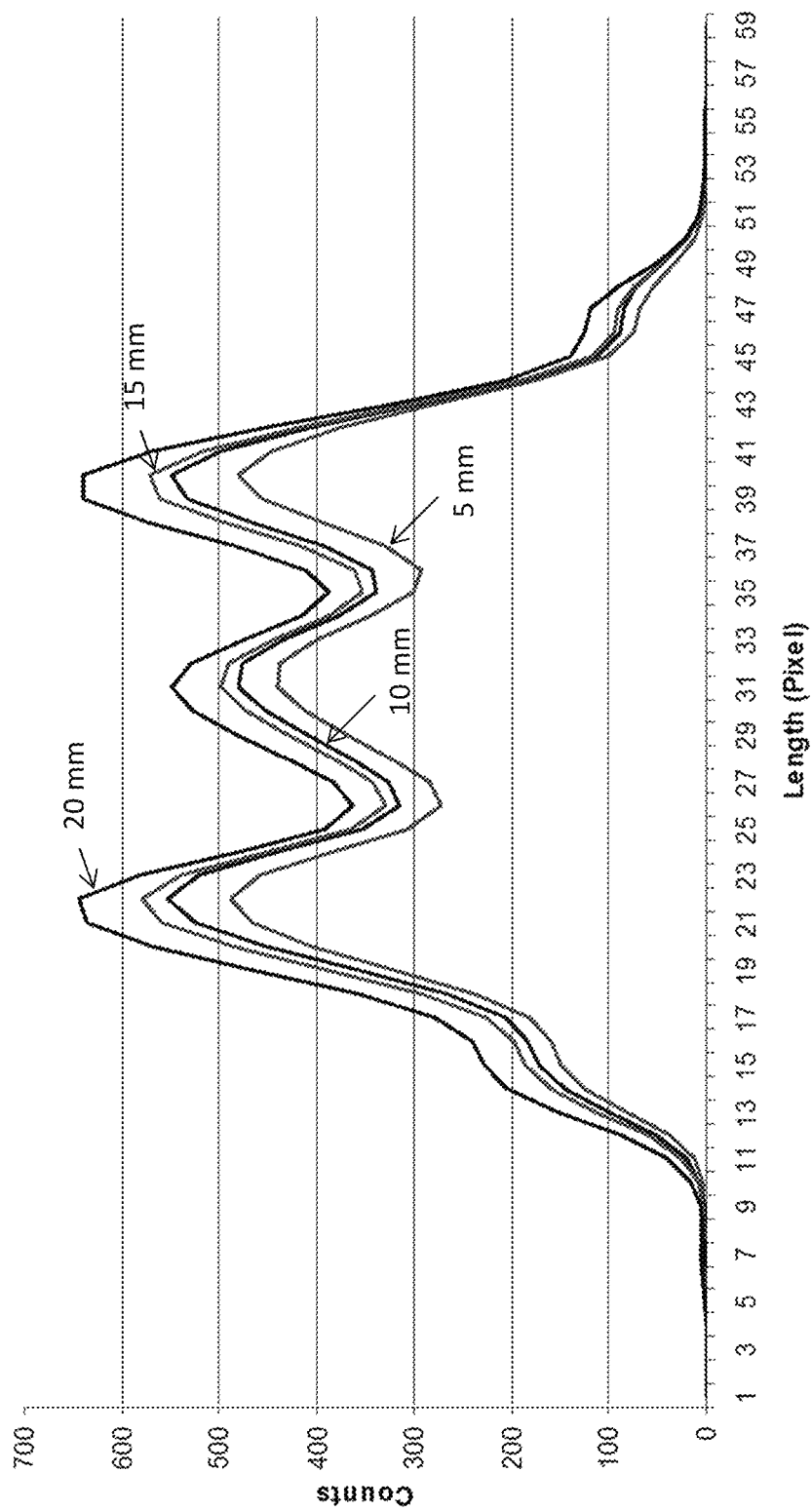
FIG. 15 is a plot of counts as a function of length for a line profile for an image using doseless attenuation correction of the various embodiments for skull thicknesses of 5 mm, 10 mm, 15 mm, and 20 mm.

Additionally, any differences observed can be due incorrect selection of boundary segmentation or mu map parameters. For example, skull thickness can have a significant impact on the attenuation correction. This is illustrated in FIG. 15. FIG. 15 is a plot of counts as a function of length for a line profile for an image using doseless attenuation correction of the various embodiments for skull thicknesses of 5 mm, 10 mm, 15 mm, and 20 mm. As shown in FIG. 15, as skull thickness is increased, count increase as well.

Accordingly, some tuning of skull thickness or other parameters may be necessary during operation.

Comparison to the Method of Chang

In the previous examples, the results were primarily discussed with respect to CT attenuation correction. However, the doseless attenuation method of the various embodiments also performs favorably when compared to the methods of Chang. These results are shown in FIGS. 16A, 16B, and 16C for a clinical brain.

Figure 16A:
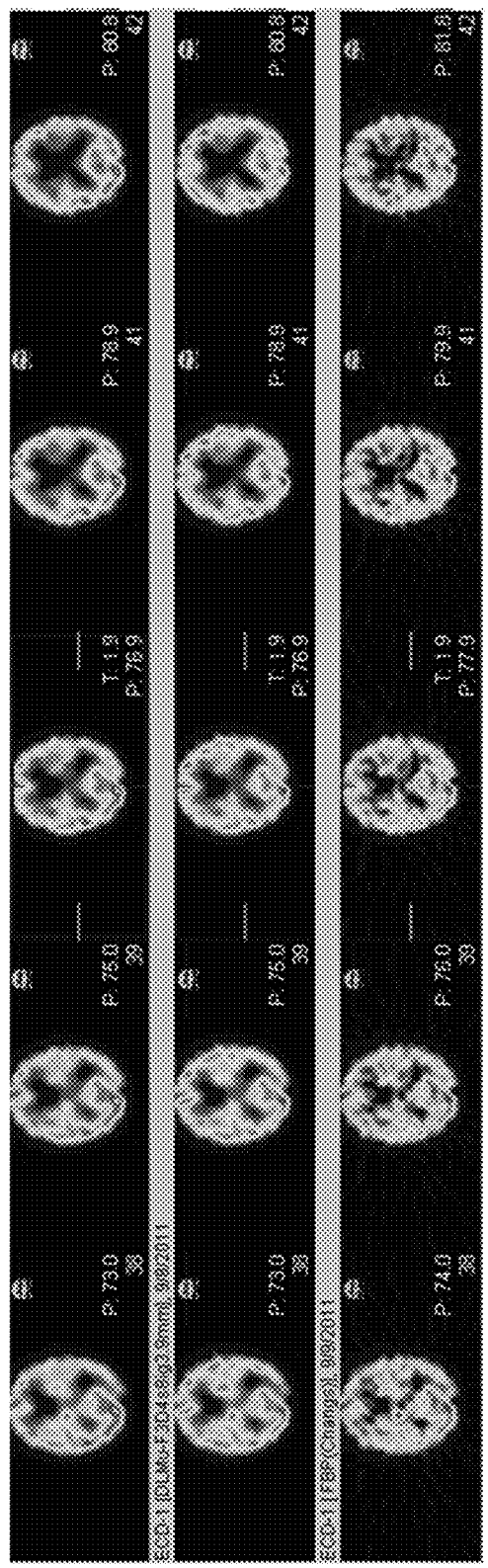
FIG. 16A shows various top cross-section reconstructed images using CT attenuation correction (top row), the doseless attenuation correction of the various embodiments (middle row), and using FBP with Chang's attenuation correction (bottom row)
Figure 16B:
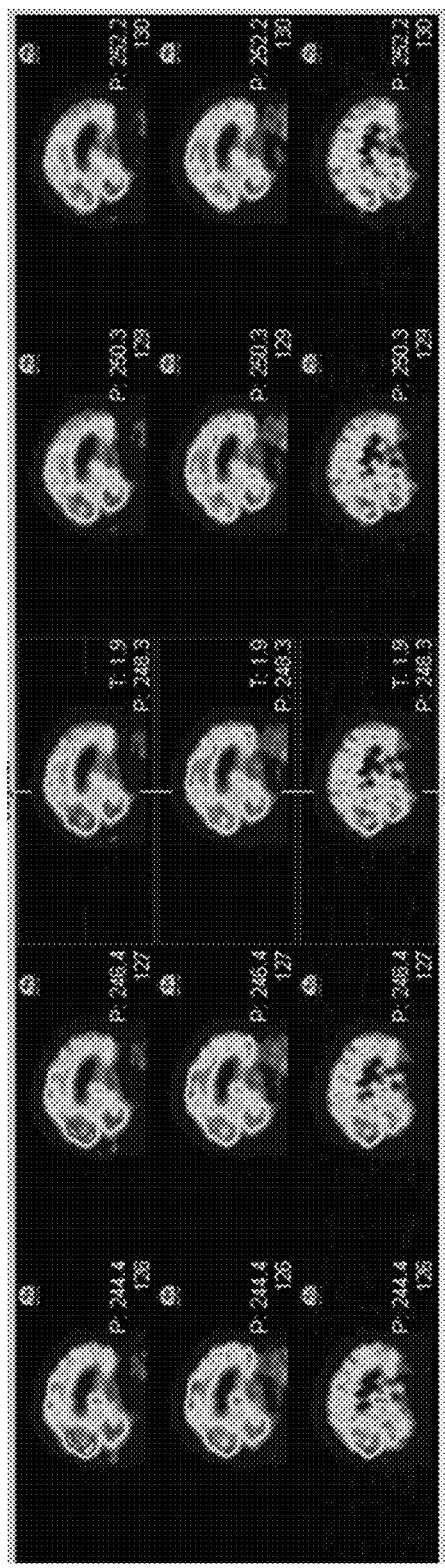
FIG. 16B shows various side cross-section reconstructed images using CT attenuation correction (top row), the doseless attenuation correction of the various embodiments (middle row), and using FBP with Chang's attenuation correction (bottom row)
Figure 16C:
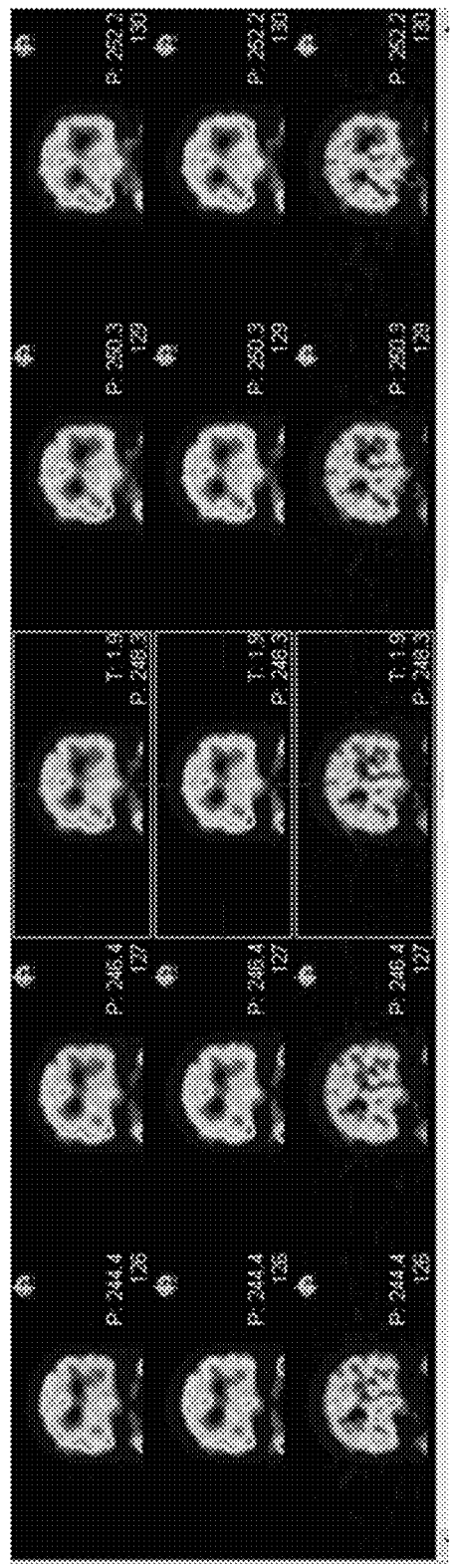
FIG. 16C shows various side cross-section reconstructed images using CT attenuation correction (top row), the doseless attenuation correction of the various embodiments (middle row), and using FBP with Chang's attenuation correction (bottom row)

FIG. 16A shows various top cross-section reconstructed images using CT attenuation correction (top row), the doseless attenuation correction of the various embodiments (middle row), and using FBP with Chang's attenuation correction (bottom row). FIG. 16B shows various side cross-section reconstructed images using CT attenuation correction (top row), the doseless attenuation correction of the various embodiments (middle row), and using FBP with Chang's attenuation correction (bottom row). FIG. 16C shows various side cross-section reconstructed images using CT attenuation correction (top row), the doseless attenuation correction of the various embodiments (middle row), and using FBP with Chang's attenuation correction (bottom row).

As can be seen from the images, at least qualitatively, the amount of detail visible in the images using the doseless attenuation correction of the various embodiments exceeds that observed in the images using FBP with Chang's attenuation correction. Moreover, the amount of detail visible in the images using the doseless attenuation correction of the various embodiments appears to be comparable to that observed in the images using CT attenuation correction. Thus, FIGS. 16A-16C show that the attenuation correction of the various embodiments further provides an improvement in performance over the conventional use of FBP with Chang's attenuation correction (bottom row).

Figure 17:
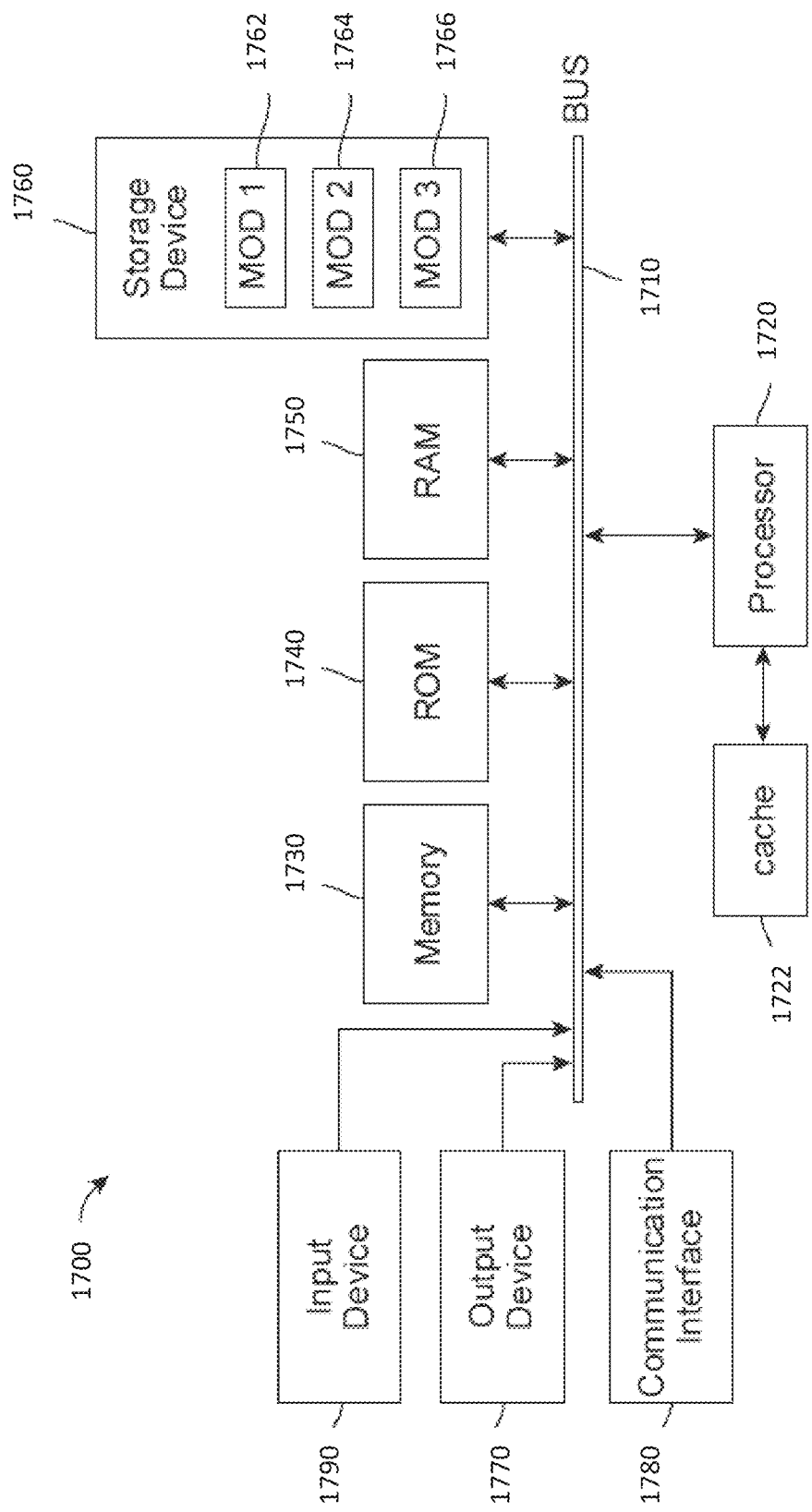
FIG. 17 illustrates an exemplary computer system for implementing the various embodiments.

The systems, methods, and computer-readable media described above can be employed in a variety of ways known to those with ordinary skill in the art having the benefit of this disclosure; however, a brief description of a basic general purpose system or computing device in FIG. 17 can provide an example of how to practice the concepts disclosed herein.

FIG. 17 illustrates an exemplary computer system for implementing the present technology according to some embodiments of the present technology. As illustrated in FIG. 17, an exemplary system includes a general-purpose computing device 1700, including a processing unit (CPU or processor) 1720 and a system bus 1710 that couples various system components including the system memory 1730 such as read only memory (ROM) 1740 and random access memory (RAM) 1750 to the processor 1720. The system 1700 can include a cache of high speed memory connected directly with, in close proximity to, or integrated as part of the processor 1720. The system 1700 copies data from the memory 1730 and/or the storage device 1760 to the cache for quick access by the processor 1720. In this way, the cache provides a performance boost that avoids processor 1720 delays while waiting for data. These and other modules can control or be configured to control the processor 1720 to perform various actions. Other system memory 1730 may be available for use as well. The memory 1730 can include multiple different types of memory with different performance characteristics. It can be appreciated that the disclosure may operate on a computing device 1700 with more than one processor 1720 or on a group or cluster of computing devices networked together to provide greater processing capability. The processor 1720 can include any general purpose processor and a hardware module or software module, such as module 1 1762, module 2 1764, and module 3 1766 stored in storage device 1760, configured to control the processor 1720 as well as a special-purpose processor where software instructions are incorporated into the actual processor design. The processor 1720 may essentially be a completely self-contained computing system, containing multiple cores or processors, a bus, memory controller, cache, etc. A multi-core processor may be symmetric or asymmetric.

The system bus 1710 may be any of several types of bus structures including a memory bus or memory controller, a peripheral bus, and a local bus using any of a variety of bus architectures. A basic input/output (BIOS) stored in ROM 1740 or the like, may provide the basic routine that helps to transfer information between elements within the computing device 1700, such as during start-up. The computing device 1700 further includes storage devices 1760 such as a hard disk drive, a magnetic disk drive, an optical disk drive, tape drive or the like. The storage device 1760 can include software modules 1762, 1764, 1766 for controlling the processor 1720. Other hardware or software modules are contemplated. The storage device 1760 is connected to the system bus 1710 by a drive interface. The drives and the associated computer readable storage media provide non-volatile storage of computer readable instructions, data structures, program modules and other data for the computing device 1700. In one aspect, a hardware module that performs a particular function includes the software component stored in a non-transitory computer-readable medium in connection with the necessary hardware components, such as the processor 1720, bus 1710, display 1770, and so forth, to carry out the function. The basic components are known to those of skill in the art and appropriate variations are contemplated depending on the type of device, such as whether the device 1700 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 1750, read only memory (ROM) 1740, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 1700, an input device 1790 represents any number of input mechanisms, such as a microphone for speech, a touch-sensitive screen for gesture or graphical input, keyboard, mouse, motion input, speech and so forth. An output device 1770 can also be one or more of a number of output mechanisms known to those of skill in the art. In some instances, multimodal systems enable a user to provide multiple types of input to communicate with the computing device 1700. The communications interface 1780 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 1720. The functions these blocks represent may be provided through the use of either shared or dedicated hardware, including, but not limited to, hardware capable of executing software and hardware, such as a processor 1720, that is purpose-built to operate as an equivalent to software executing on a general purpose processor. For example the functions of one or more processors presented in FIG. 17 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 1740 for storing software performing the operations discussed below, and random access memory (RAM) 1750 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 1700 shown in FIG. 17 can practice all or part of the recited methods, can be a part of the recited systems, and/or can operate according to instructions in the recited non-transitory computer-readable storage media. Such logical operations can be implemented as modules configured to control the processor 1720 to perform particular functions according to the programming of the module. For example, FIG. 17 illustrates three modules Mod1 1762, Mod2 1764 and Mod3 1766 which are modules configured to control the processor 1720. These modules may be stored on the storage device 1760 and loaded into RAM 1750 or memory 1730 at runtime or may be stored as would be known in the art in other computer-readable memory locations.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Figure 18:
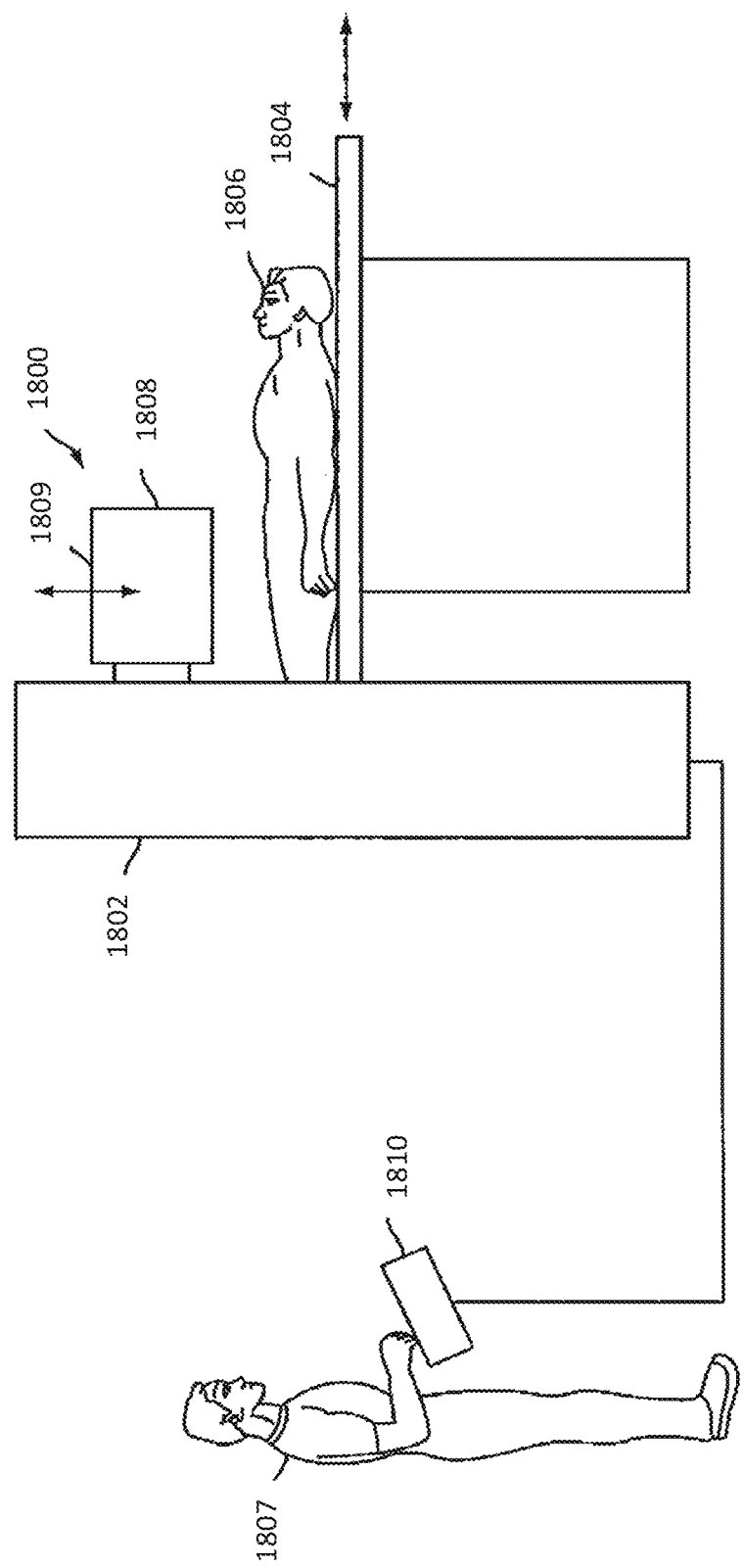
FIG. 18 depicts components of an exemplary SPECT system 1800 (i.e., having a gamma or scintillation camera) for use with the various embodiments.

FIG. 18 depicts components of an exemplary SPECT system 1800 (i.e., having a gamma or scintillation camera) for use with the various embodiments. The system 1800 includes a gantry 1802 supporting one or more detectors 1808 enclosed within a metal housing and movably supported proximate a patient 1806 located on a patient support (e.g., pallet or table) 1804. The detectors are proximate collimators 1809. The collimators a parallel beam, fan beam, multifocal collimator and the like. Typically, the positions of the detectors 1808 can be changed to a variety of orientations to obtain images of a patient's body from various angles and locations along the patient's body. In many instances, a data acquisition console 1810 (e.g., with a user interface and/or display) is located proximate a patient during use for a technologist 1807 to manipulate during data acquisition. In addition to the data acquisition console 1810, images are often "reconstructed" or developed from the acquired image data ("projection data") via a processing computer system that is operated at another image processing computer console including, e.g., an operator interface and a display, which may often be located in another room, to develop images. By way of example, the image acquisition data may, in some instances, be transmitted to the processing computer system after acquisition using the acquisition console.

To acquire SPECT images, the gamma camera is rotated around the patient on a gantry. Projections are acquired at defined points during the rotation, typically every 3-6 degrees. In most cases, a full 360 degree rotation is used to obtain an optimal reconstruction. The time taken to obtain each projection is also variable For example with Siemens IQ SPECT the time is minimal since the system uses a "sweet spot" based imaging technology where the organ of interest is always within view of the camera. Groups of projections are taken successively as the patient 1806 on the table 1804 is moved incrementally through the gantry 1802 through the region of the patient 1806 to be imaged. This gives a variable scan time 3 to 185 minutes depending on what is being scanned. Multi-headed gamma cameras can provide accelerated acquisition. For example, a dual headed camera can be used with heads spaced 1880 degrees apart, allowing two projections to be acquired simultaneously, with each head requiring 1880 degrees of rotation. Triple-head cameras with 1820 degree spacing are also used.

A computer is then used to apply a tomographic reconstruction algorithm to the multiple projections, yielding a 3-D dataset. This dataset may then be manipulated to show thin slices along any chosen axis of the body, similar to those obtained from other tomographic techniques, such as MRI, CT, and PET.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A method of generating corrected emission tomography images, comprising:
    reconstructing and creating a 3D smoothed volume using emission tomography data of a head of a patient;
    using said smoothed volume to define a boundary region estimating a position of a skull of the patient in the smoothed volume; and
    generating a map of attenuation coefficient values for the smoothed volume based on the defined boundary region,
    wherein the attenuation coefficient values within the boundary region are selected to correspond to an attenuation coefficient value for bone, and wherein the attenuation coefficient values for the portion of the image surrounded by the boundary region are selected to correspond to an attenuation value for tissue.

2. The method of claim 1, further comprising:
    correcting the emission tomography data based at least on the map of attenuation coefficient values.

3. The method of claim 1, wherein defining a boundary region comprises searching for a natural boundary of the skull in the smoothed volume.

4. The method of claim 3, wherein the searching comprises:
    selecting a threshold pixel value;
    generating a binary image from the smoothed volume based on the threshold pixel value; and
    selecting pixels in the smoothed volume to be associated with the natural boundary based on a boundary tracking algorithm.

5. The method of claim 1, wherein defining a boundary region comprises approximating a natural boundary of the skull using a model shape.

6. The method of claim 5, wherein the model shape comprises a super ellipse.

7. The method of claim 1, wherein reconstructing and creating said smoothed 3D volume uses a portion of the emission tomography data associated with a scatter window.

8. The method of claim 1, wherein the emission tomography data comprises single photon emission tomography data.

9. A system for correcting emission tomography images, comprising:
    a processor;
    a computer readable medium storing instructions for controlling the processor to perform steps comprising:
    reconstructing and creating a smoothed 3D volume using emission tomography data of a head of a patient;
    using said smoothed volume to define a boundary region estimating a position of a skull of the patient in the smoothed volume; and
    generating a map of attenuation coefficient values for the smoothed volume based on the boundary region,
    wherein the attenuation coefficient values within the boundary region are selected to correspond to an attenuation coefficient value for bone, and wherein the attenuation coefficient values for the portion of the image surrounded by the boundary region are selected to correspond to an attenuation value for tissue.

10. The system of claim 9, the steps further comprising:
    instructions for correcting the emission tomography data based at least on the map of attenuation coefficient values.

11. The system of claim 9, wherein defining a boundary region comprises searching for a natural boundary of the skull in the smoothed volume.

12. The system of claim 11, wherein the searching comprises:
    obtaining a threshold pixel value;
    generating a binary image from the smoothed volume based on the threshold pixel value; and
    selecting pixels in the smoothed volume to be associated with the natural boundary based on a boundary tracking algorithm.

13. The system of claim 9, wherein defining a boundary region comprises approximating a natural boundary of the skull using a model shape.

14. The system of claim 13, wherein the model shape comprises a super ellipse.

15. The system of claim 9, wherein reconstructing and creating said smoothed 3D volume uses a portion of the emission tomography data associated with a scatter window.

16. The system of claim 9, wherein the emission tomography data comprises single photon emission tomography data.

17. A non-transitory computer readable medium having stored thereon a plurality of instructions for performing a method of generating corrected emission tomography images, the method comprising:
- reconstructing and creating a 3D smoothed volume using emission tomography data of a head of a patient;
- using said smoothed volume to define a boundary region; and
- generating a map of attenuation coefficient values for the smoothed volume based on the boundary region,
- wherein the attenuation coefficient values within the boundary region are selected to correspond to an attenuation coefficient value for bone, and wherein the attenuation coefficient values for the portion of the image surrounded by the boundary region are selected to correspond to an attenuation value for tissue.

18. The non-transitory computer readable medium of claim 17, the method further comprising:
- correcting the emission tomography data based at least on the map of attenuation coefficient values.

19. The non-transitory computer readable medium of claim 17,
- wherein defining comprises one of searching for a natural boundary of the skull in the smoothed volume or approximating a natural boundary of the skull using a model shape.

20. The non-transitory computer readable medium of claim 17, wherein reconstructing and creating said 3D smoothed volume uses a portion of the emission tomography data associated with a scatter window.

\* \* \* \* \*